United States Patent
Cai et al.

(10) Patent No.: US 9,384,471 B2
(45) Date of Patent: *Jul. 5, 2016

(54) SPAM REPORTING AND MANAGEMENT IN A COMMUNICATION NETWORK

(75) Inventors: Yigang Cai, Naperville, IL (US); Sanjeev Singh, New Albany, OH (US); Gyan Shanker, Naperville, IL (US); Kris Nayak, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 435 days.

This patent is subject to a terminal disclaimer.

(21) Appl. No.: 13/399,267

(22) Filed: Feb. 17, 2012

(65) Prior Publication Data

US 2012/0215862 A1    Aug. 23, 2012

Related U.S. Application Data

(60) Provisional application No. 61/445,351, filed on Feb. 22, 2011.

(51) Int. Cl.
*G06F 15/16* (2006.01)
*G06Q 10/10* (2012.01)
*H04L 29/06* (2006.01)
(Continued)

(52) U.S. Cl.
CPC ............ *G06Q 10/107* (2013.01); *H04L 12/585* (2013.01); *H04L 47/824* (2013.01); *H04L 51/12* (2013.01); *H04L 63/0227* (2013.01); *H04L 63/102* (2013.01)

(58) Field of Classification Search
CPC ..... H04L 51/12; H04L 12/585; H04L 47/824; H04L 63/0227; H04L 63/102; G06Q 10/107

USPC ......................................................... 709/206
See application file for complete search history.

(56) References Cited

U.S. PATENT DOCUMENTS

| | | | |
|---|---|---|---|
| 7,610,342 B1 * | 10/2009 | Pettigrew et al. | 709/206 |
| 7,647,376 B1 | 1/2010 | Jagger et al. | |
| 7,698,370 B1 | 4/2010 | Hall | |

(Continued)

FOREIGN PATENT DOCUMENTS

WO    WO2005001733 A1    1/2005

OTHER PUBLICATIONS

Cai et al; Anti-spam Policy Instruction/Distribution Operation Draft-CAI-Marf-Policy-Instruction-Operation.txt, Internet Engineering Task Force, IETF; standardworkingdraft, Internet Society (ISOC) 4, Rue Des Falaises CH-1205 Geneva Swizerland, 20101-11-23 pp. 1-26 XP15071078.

*Primary Examiner* — Oleg Survillo
(74) *Attorney, Agent, or Firm* — Duft Bornsen & Fettig, LLP

(57) ABSTRACT

Systems and methods for spam detection within electronic messages transported over a communication network. One embodiment is a spam center that connects to multiple entities of a communication network that handle electronic messages, such as text messages. The spam center receives spam reports from the entities that detect spam in prior electronic messages, analyzes the spam reports to generate spam filtering rules based on the spam detected in the prior electronic messages. The spam center then distributes the spam filtering rules to one or more of the entities. The entities may then use to spam filtering rules to filter spam out of electronic messages that subsequently received.

17 Claims, 5 Drawing Sheets

(51) Int. Cl.
*H04L 12/58* (2006.01)
*H04L 12/911* (2013.01)

(56) References Cited

U.S. PATENT DOCUMENTS

| | | | |
|---|---|---|---|
| 8,200,552 B2 * | 6/2012 | Swanson | 705/27.1 |
| 8,204,930 B1 | 6/2012 | Kee et al. | |
| 8,396,927 B2 * | 3/2013 | Cai et al. | 709/206 |
| 8,918,466 B2 * | 12/2014 | Yu | H04L 51/28 709/206 |
| 2005/0044206 A1 | 2/2005 | Johansson | |
| 2005/0188091 A1 * | 8/2005 | Szabo et al. | 709/227 |
| 2006/0104423 A1 | 5/2006 | Heidloff | |
| 2006/0168030 A1 | 7/2006 | Cai et al. | |
| 2006/0168035 A1 | 7/2006 | Cai et al. | |
| 2006/0195912 A1 | 8/2006 | Dew | |
| 2006/0256012 A1 | 11/2006 | Fok et al. | |
| 2007/0156898 A1 * | 7/2007 | Appleby et al. | 709/225 |
| 2007/0224971 A1 * | 9/2007 | Jung et al. | 455/411 |
| 2008/0102799 A1 * | 5/2008 | Dholakia et al. | 455/412.1 |
| 2008/0126221 A1 * | 5/2008 | Swanson | 705/26 |
| 2009/0063371 A1 | 3/2009 | Lin | |
| 2009/0077617 A1 * | 3/2009 | Levow et al. | 726/1 |
| 2009/0210477 A1 | 8/2009 | White | |
| 2009/0219946 A1 * | 9/2009 | Liu et al. | 370/437 |
| 2010/0263045 A1 * | 10/2010 | Dulitz | H04L 51/12 726/22 |
| 2011/0055343 A1 * | 3/2011 | Gleeson et al. | 709/206 |
| 2011/0161425 A1 * | 6/2011 | Xiao et al. | 709/206 |
| 2011/0191847 A1 | 8/2011 | Davis et al. | |
| 2011/0289169 A1 * | 11/2011 | Lee | G06Q 10/107 709/206 |
| 2012/0096046 A1 * | 4/2012 | Kucera | 707/802 |
| 2012/0120887 A1 | 5/2012 | Deaton | |
| 2012/0150967 A1 | 6/2012 | Cai et al. | |
| 2012/0185550 A1 | 7/2012 | Hart | |
| 2012/0215862 A1 | 8/2012 | Cai et al. | |
| 2012/0284795 A1 | 11/2012 | Durie | |
| 2013/0018707 A1 | 1/2013 | Agarwal | |

* cited by examiner

SPAM REPORTING AND MANAGEMENT IN A COMMUNICATION NETWORK

RELATED APPLICATIONS

This non-provisional application claims priority to U.S. provisional application 61/445,351, filed on Feb. 22, 2011, which is incorporated herein by reference as if fully provided herein.

FIELD OF THE INVENTION

The invention is related to the field of communications, and more particularly, to handling spam in a communication network.

BACKGROUND

Almost every user of an electronic messaging technology has encountered spam messages. Spam is the use of electronic messaging systems to send unsolicited messages indiscriminately to multiple end users. The most widely recognized form of spam is email spam, but the term is applied to instant messaging (IM), Short Messaging Service (SMS), Multimedia Messaging Service (MMS), social networking, and other types of messaging.

Some communication networks have a centralized spam agent that tracks spam messages that are transported in the network. End user devices and network nodes (e.g., an email server, SMS-Center, MMS-Center) may be programmed to report spam messages to the centralized spam agent. Standards organizations have defined formats for the spam reports. For example, the Internet Engineering Task Force (IETF) has defined a Message Abuse Reporting Format (MARF) for reporting spam to the centralized agent. Similarly, the Open Mobile Alliance (OMA) has suggested a format for reporting spam ("Mobile Spam Reporting Technical Specification"; OMA-TS-SpamRep-V1_0-20100601-D).

Unfortunately, present reporting standards for spam are insufficient, and the centralized agent does not adequately protect the network from spam.

SUMMARY

Embodiments described herein provide improved spam detection and filtering. A centralized spam center receives spam reports from entities that detect spam in electronic messages that they previously handled. The spam center processes the spam reports to generate spam filtering rules, and distributes the spam filtering rules to message centers or other entities within the network. The entities may then use the spam filtering rules to filter spam in subsequently-received electronic messages. This is advantageous because the spam center is able to generate the spam filtering rules based on the reports provided by multiple entities in the network. For example, if a message center detects spam in a text message from a certain phone number, and a phone detects spam from certain content in a text message, then the centralized spam center is able to generate spam filtering rules based on the reports provided by the message center and the phone. The centralized spam center has a lot of data from which to generate the spam filtering rules. Not only does the spam center generate the rules, but it is able to distribute the spam filtering rules to the appropriate entities in the network that handle electronic messages. These entities are then able to filter future messages based on the spam filtering rules.

One embodiment comprises a spam center configured to connect to entities of a communication network that handle electronic messages. The spam center is configured to receive spam reports from the entities that detect spam in prior electronic messages, and analyze the spam reports to generate spam filtering rules based on the spam detected in the prior electronic messages. The spam center is further configured to distribute the spam filtering rules to one or more entities for filtering spam in subsequent electronic messages.

In another embodiment, the spam center is further configured to receive a request from the entities to subscribe to the spam filtering rules, and to distribute the spam filtering rules to the entities that have subscribed to receive the spam filtering rules.

In another embodiment, the spam center is further configured to distribute the spam filtering rules to the entities at a next scheduled event.

In another embodiment, the spam center is further configured to parse the request to identify rule identifiers that indicate the spam filtering rules previously used by the entity(ies), and to distribute the spam filtering rules to the entities based on whether the spam filtering rules differ from the previously-used spam filtering rules.

In another embodiment, the spam center is further configured to receive a request from the entities for the spam filtering rules, and to distribute the spam filtering rules by sending a response to the entities that includes the spam filtering rules.

In another embodiment, the spam center is further configured to receive a request from entities for the spam filtering rules, to send a response that includes a result code, and to distribute the spam filtering rules by sending another request to the entities that includes the spam filtering rules.

Another embodiment comprises a messaging entity of a communication network that is configured to handle electronic messages transmitted over the communication network. The messaging entity is configured to detect spam in the electronic messages based on spam filtering rules, generate spam reports for the electronic messages detected as comprising spam, and transmit the spam reports to a centralized spam center that connects to multiple other messaging entities of the communication network. The messaging entity is further configured to receive updated spam filtering rules from the centralized spam center that are generated based on the spam reports, and filter spam from subsequent electronic messages based on the updated spam filtering rules.

In another embodiment, the messaging entity is further configured to identify at least a portion of the updated spam filtering rules to accept for filtering, and to handle the subsequent electronic messages based on the updated spam filtering rules that are accepted.

In another embodiment, the messaging entity is further configured to identify at least a portion of the updated spam filtering rules to ignore for filtering, and to handle the subsequent electronic messages based on the updated spam filtering rules that are not ignored.

In another embodiment, the messaging entity is further configured to transmit a request to the centralized spam center for the updated spam filtering rules.

In another embodiment, the electronic messages comprise text messages, and the messaging entity comprises a text message center.

In another embodiment, the messaging entity is further configured to activate the updated spam filtering rules received from the centralized spam center immediately.

In another embodiment, the messaging entity is further configured to activate the updated spam filtering rules received from the centralized spam center at a later time.

In another embodiment, the messaging entity is further configured to distribute the updated spam filtering rules to other messaging entities of the communication network.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
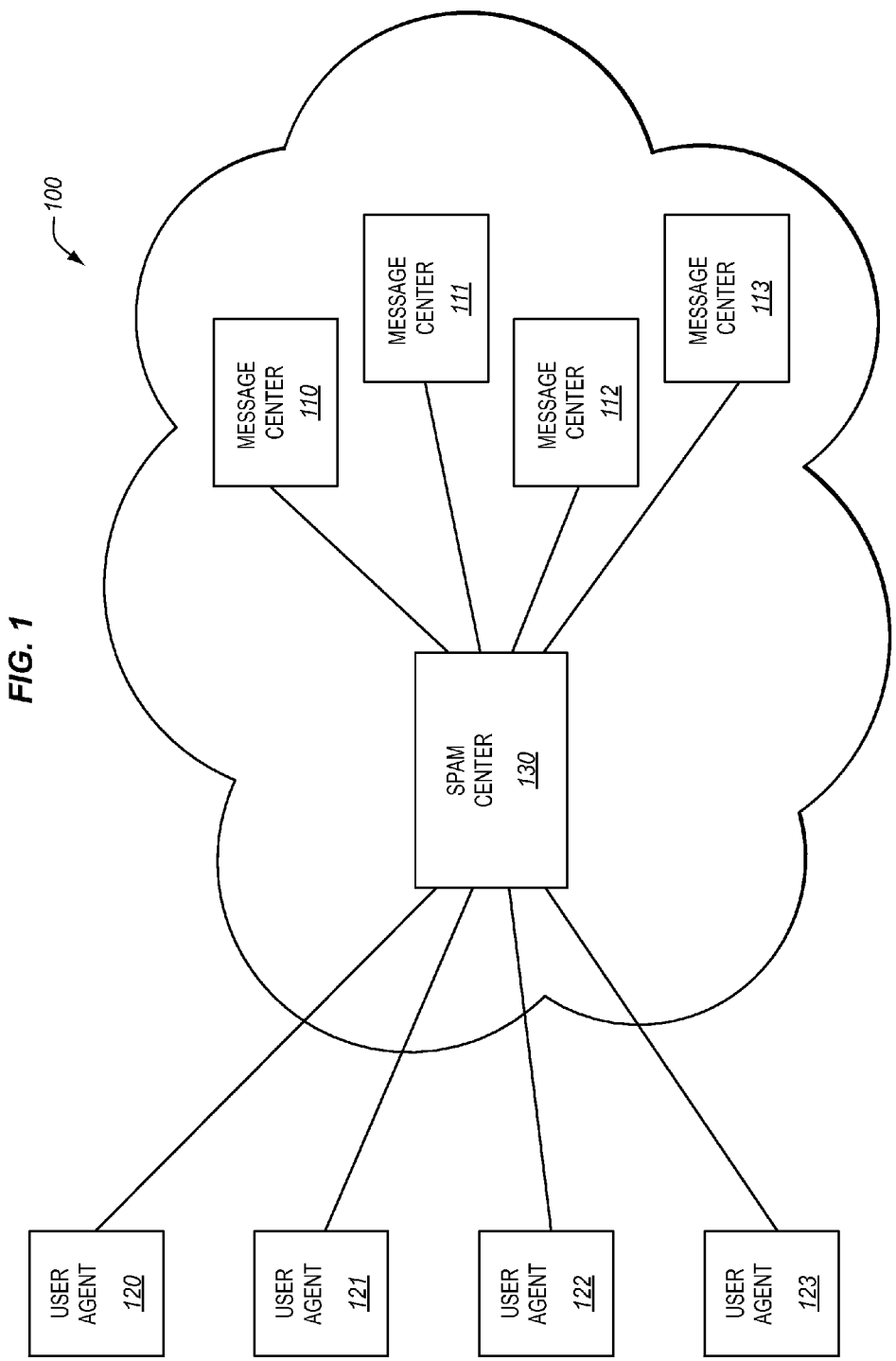
FIG. 1 illustrates a communication network in an exemplary embodiment.

FIG. 1 illustrates a communication network 100 in an exemplary embodiment. Communication network 100 comprises a packet-switched network that is operable to transport electronic messages. Electronic messages comprise any type of digital message that is exchanged over a network. Some examples of an electronic message are emails, Short Messaging Service (SMS) messages, Multimedia Messaging Service (MMS) messages, Instant Messages (IM), etc. In this embodiment, communication network 100 includes a plurality of message centers 110-113. A message center 110-113 comprises any server, router, or other system operable to handle electronic messages for delivery to a recipient. Some examples of a message center 110-113 are an SMS Center (SMSC), an MMS Center (MMSC), an email server, an Instant Messaging gateway (IM GW), etc. Communication network 100 may include multiple other servers, routers, or network elements not shown in FIG. 1.

Communication network 100 also provides service to a plurality of end user devices, referred to generally as user agents 120-123. User agents 120-123 comprise any devices (wireline or wireless) operated by end users to send or receive electronic messages. For example, a user agent 120-123 may comprise a phone or other device having an SMS application, an MMS application, an IM application, etc. A user agent 120-123 may also comprise a phone, a PC, a laptop, etc., having an email application. Message centers 110-113 and user agents 120-123 are referred to generally herein as "entities" of network 100.

Communication network 100 in FIG. 1 also includes a spam center 130. Spam center 130 comprises any system or server that receives spam reports from entities, and generates or selects spam criteria, rules, policies, algorithms, etc., (referred to herein as "spam filtering rules" or "anti-spam rules") for detecting spam in electronic messages. For example, the spam filtering rules may indicate which electronic messages comprise spam, such as by an originating/terminating address for the message, an originating/terminating domain for the message, content in the message, etc. The spam filtering rules may also indicate how to filter electronic messages that comprise spam, such as block the message, deliver the message, hold the message, etc. Spam center 130 also provides for distribution of the spam filtering rules to the entities of network 100.

When in operation, user agents 120-123 transmit and receive electronic messages over communication network 100. Message centers 110-113 handle these electronic messages that are exchanged over network 100. For example, a message center may implement store-and-forward processing of electronic messages to deliver the messages to their recipients. As part of handling the electronic messages, message centers 110-113 and/or user agents 120-123 (i.e., the "entities") may have spam handling features as further described in FIG. 2.

Figure 2:
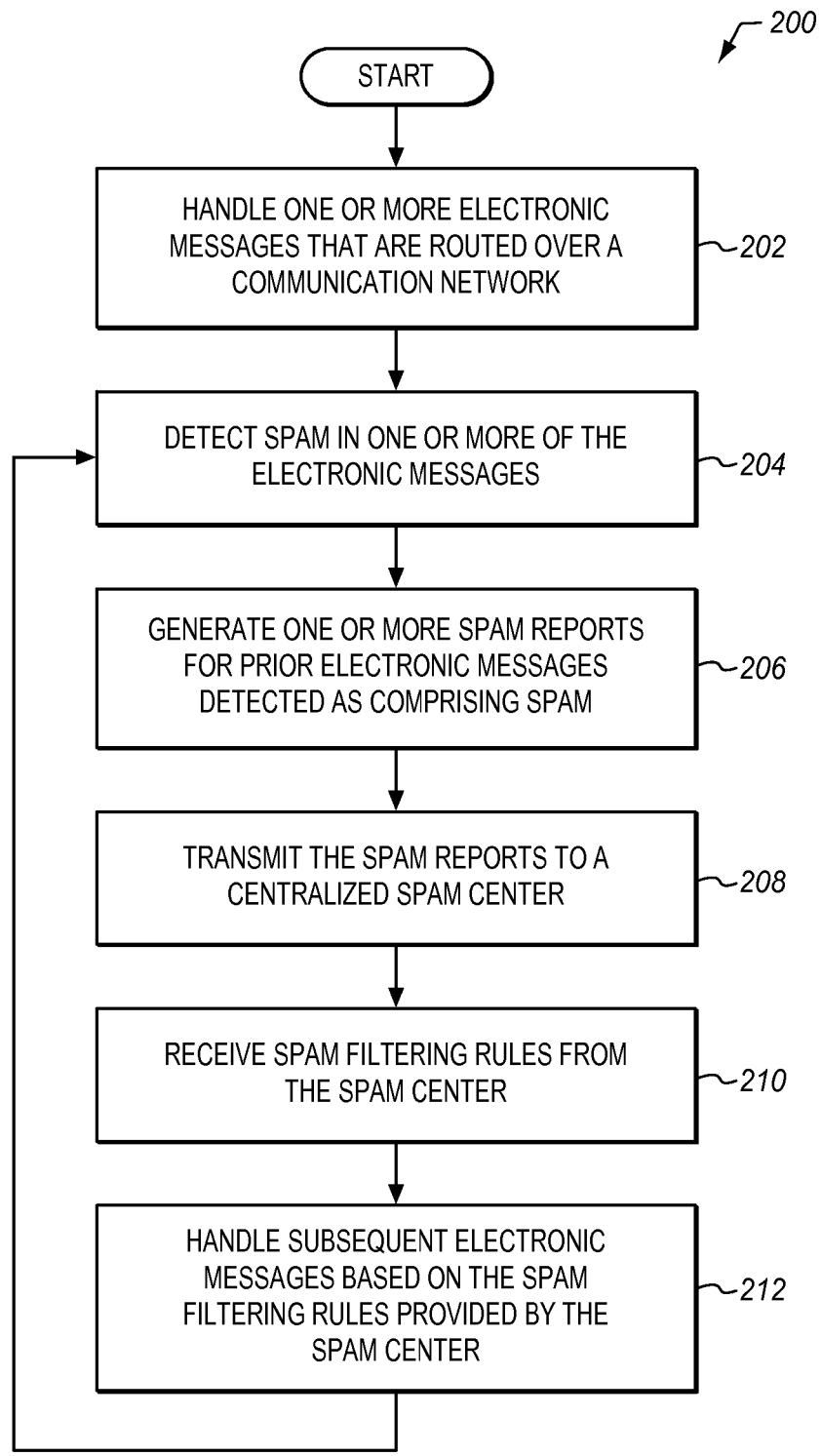
FIG. 2 is a flow chart illustrating a method of filtering spam in an exemplary embodiment.

FIG. 2 is a flow chart illustrating a method 200 of filtering spam in an exemplary embodiment. The steps of method 200 will be described with reference to network 100 in FIG. 1, but those skilled in the art will appreciate that method 200 may be performed in other networks and systems. The steps of the flow charts described herein are not all inclusive and may include other steps not shown. The steps may also be performed in an alternative order.

Method 200 may be performed in each entity of network 100, but will be described in relation to message center 110. In step 202, message center 110 handles one or more electronic messages that are routed over network 100. In step 204, message center 110 detects spam in one or more of the electronic messages. For example, message center 110 may store local spam rules that define which electronic messages are identified or suspected of comprising spam. Message center 110 may also store spam filtering rules that were previously provided by spam center 110, which also define which electronic messages are identified or suspected of comprising spam. Message center 110 may use these rules or other appropriate rules to detect spam in the electronic messages that it handles.

In step 206, message center 110 generates one or more spam reports for the prior electronic messages detected as comprising spam. A spam report comprises any data describing one or more electronic messages that are identified or suspected of comprising spam. For example, a spam report may include an origination address, an origination domain, message content, a destination address, a destination domain, etc., for a text message identified or suspected of comprising spam. In step 208, message center 110 transmits the spam reports to spam center 130. The spam report may be provided to spam center 130 periodically, such as hourly, daily, monthly, etc.

Figure 3:
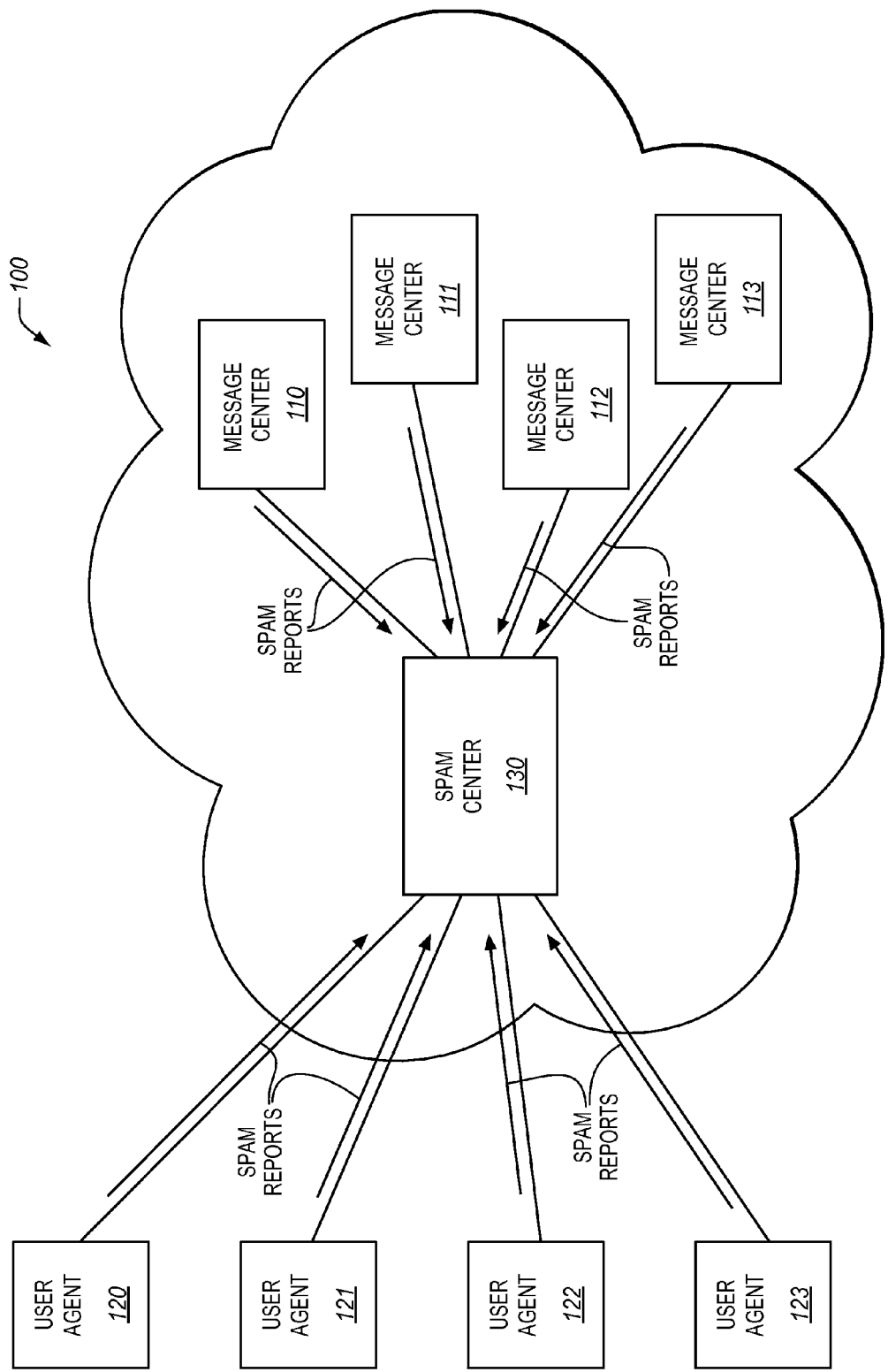
FIG. 3 illustrates entities sending spam reports to a centralized spam center in an exemplary embodiment.

Multiple entities of network 100 may operate as in method 200 to report (in a spam report) any identified or suspicious electronic messages to the centralized spam center 130. FIG. 3 illustrates the entities sending spam reports to spam center 130 in an exemplary embodiment.

Figure 4:
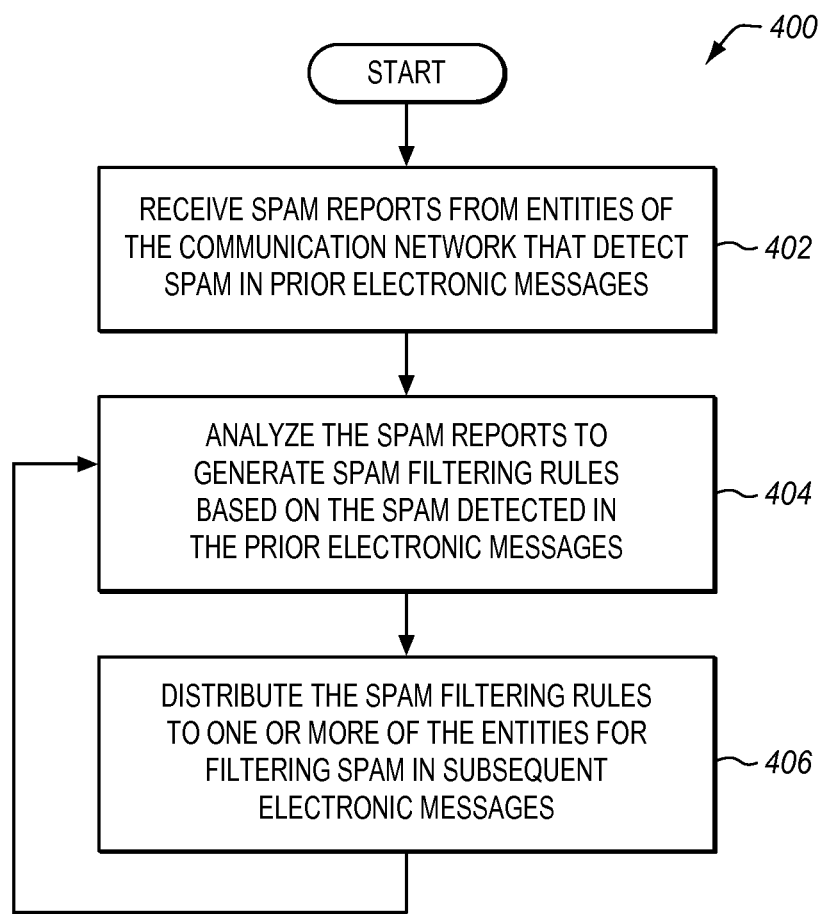
FIG. 4 is a flow chart illustrating a method of generating spam filtering rules in an exemplary embodiment.

In response to the spam reports, spam center 130 is able to generate spam filtering rules based on the spam reports as is described in FIG. 4. The spam filtering rules may be new or may be a modified/updated version of rules previously used by the entities for spam detection/filtering.

FIG. 4 is a flow chart illustrating a method 400 of generating spam filtering rules in an exemplary embodiment. The steps of method 400 will be described with reference to network 100 in FIG. 1, but those skilled in the art will appreciate that method 400 may be performed in other networks and systems.

In step 402, spam center 130 receives the spam reports from the entities, such as from message center 110. In step 404, spam center 130 analyzes the spam reports to generate or select spam filtering rules based on the spam detected in the prior electronic messages handled by entities such as message center 110.

In step 406, spam center 130 distributes the spam filtering rules to one or more of the entities for filtering spam in subsequent electronic messages. Spam center 130 may distribute the spam filtering rules based on which entities submitted spam reports, the data within the spam reports, which entities subscribed to receive spam filtering rules, etc.

Figure 5:
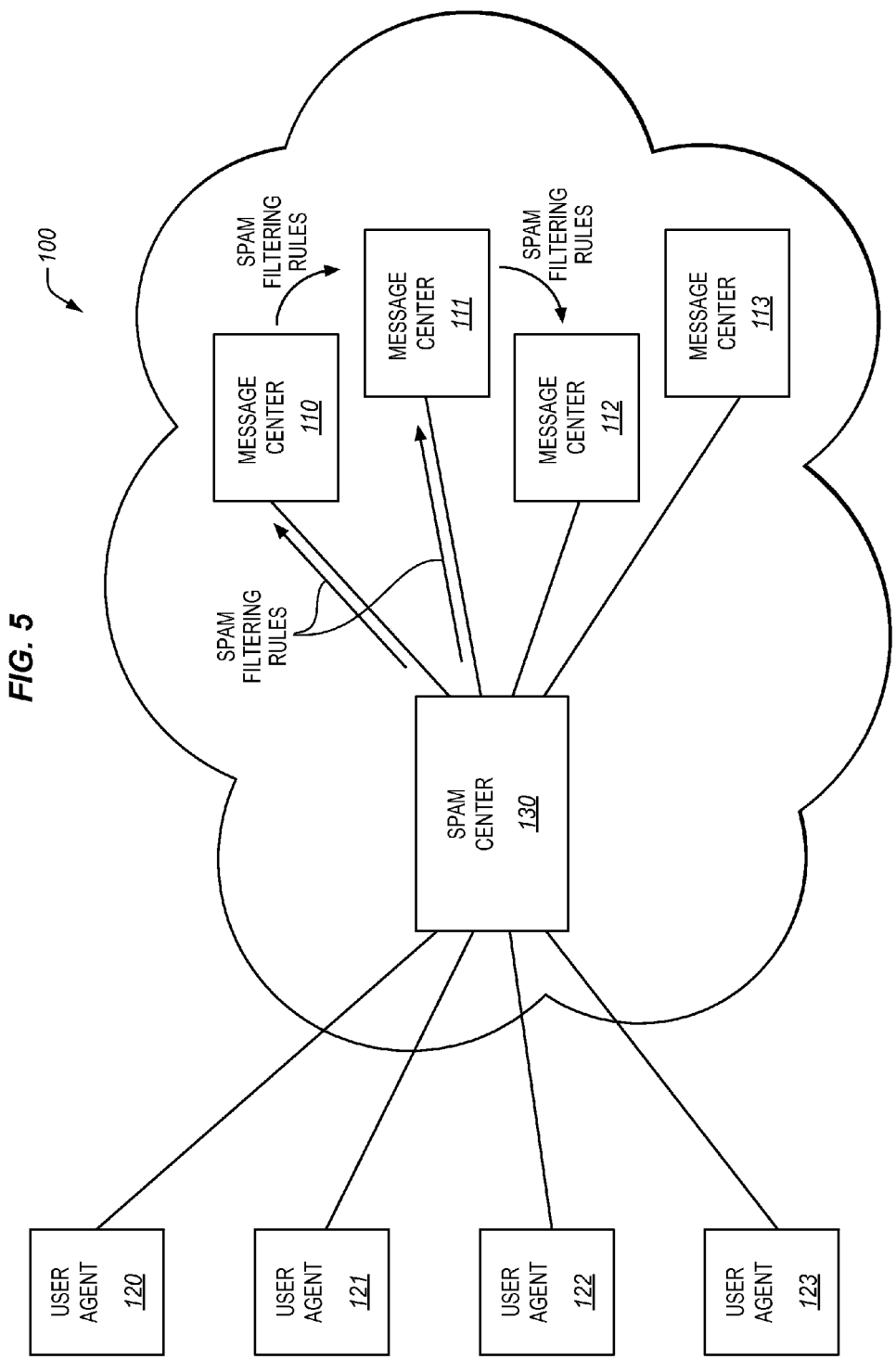
FIG. 5 illustrates a spam center distributing spam filtering rules to entities in an exemplary embodiment.

The spam filtering rules may be distributed by pushing the rules to the entities, or by having the entities pull the rules from spam center 130. Models for distributing the spam filtering rules are described in more detail below. FIG. 5 illustrates spam center 130 distributing the spam filtering rules to entities 110-111 in an exemplary embodiment. In this embodiment, spam center 130 provides the spam filtering rules to message center 110 and message center 111.

FIG. 2 further describes how an entity operates in response to receiving spam filtering rules. Message center 110, for example, receives the spam filtering rules from spam center 130 in step 210. The spam filtering rules may be new to message center 110, as it may have used local filtering rules to initially detect spam. The spam filtering rules may alternatively be updates to prior spam filtering rules that were previously provided to message center 110. In step 212, message center 110 handles subsequent (future) electronic messages based on the spam filtering rules provided by spam center 130. In other words, when a subsequent electronic message is received, message center 110 processes the spam filtering rules to detect whether the electronic message comprises spam, and what to do with the message if it is spam. Message center 110 also generates new spam reports based on the spam that is detected with the spam filtering rules. Message center 110 and other entities will provide the new spam reports to spam center 130 so that spam center 130 can update the spam filtering rules yet again. This process continues so that the spam filtering rules are current and optimized for detecting spam.

When receiving the spam filtering rules, message center 110 may identify a portion or all of the spam filtering rules to accept for filtering, and then handle subsequent electronic messages based on the accepted spam filtering rules. Message center 110 may identify a portion or all of the spam filtering rules to ignore for filtering, and handle subsequent electronic messages based on the spam filtering rules that are not ignored. If message center 110 previously used spam filtering rules from spam center 130, then message center 110 may compare the previous spam filtering rules to the new spam filtering rules (i.e., the rules most recently received from spam center 130). Message center 110 may then update the spam filtering rules based on differences found in the comparison, and handle the other electronic messages based on the updated spam filtering rules.

In addition to spam center 130 distributing the spam filtering rules to entities, one entity may distribute the spam filtering rules to other entities. For example, message center 110 shown in FIG. 5 receives spam filtering rules from spam center 130. In addition to using the spam filtering rules to handle electronic messages, message center 110 distributes the spam filtering rules to message center 111. Message center 111 may then use the spam filtering rules to handle electronic messages. Message center 111 may then distribute the spam filtering rules to message center 112. Message center 112 may then use the spam filtering rules to handle electronic messages. Therefore, spam center 130 and the entities themselves are able to distribute spam filtering rules.

The procedures for distributing spam filtering rules support both unsolicited and solicited models. In an unsolicited model, spam center 130 pushes the spam filtering rules to one or more entities without a request from the entities. To do so, spam center 130 determines which spam filtering rules (or policies/criteria) should be included in the operation, which entities should receive the spam filtering rules, the schedule (day and time) to send the request to entities (the schedule can be provisioned statically or determined during run time), etc. Spam center 130 then assembles a request that includes the spam filtering rules, and sends the assembled request to the identified entities as per the selected schedule. The request may include the following message elements:

Request:

|  |  |
|---|---|
|   | Request ID |
|   | Request timestamp |
|   | Originating node address |
|   | Terminating node address |
| * | Policy Body |
|   | { |
|   |     Policy ID |
|   |     Network types |
| * |     Protocol ID |
| * |     Message Types |
|   |     Message attributes |
| * |     Suspicious network domain |
| * |     Suspicious address |
| * |     Suspicious address type |
|   |     Spam type |
|   |     Language indicator |
|   |     Detection information |
|   |     { |
| * | Algorithm ID |
| * |     Rule ID |
| * |     Spam Keyword |
| * |     Spam Pattern |
|   | } |
|   | Action information |
|   | { |
|   |     Block with notification |
|   |     Block without notification |
|   |     Unblock and deliver |
|   |     Hold and quarantine |
|   | } |
|   | Privacy shield information |
|   | Affective filtering start timestamp |
|   | Affective filtering stop timestamp |

* sign indicates the message element should be multiple occurrences.

When the entity, such as message center 110, receives the request with the spam filtering rules, message center 110 may operate as follows. Message center 110 parses the request from spam center 130 to extract the message elements enclosed in the request, such as the spam filtering rules. Message center 110 then processes the content of the message elements, and takes the appropriate action. For instance, message center 110 may accept a part or all of the spam filtering rules included in the request, may ignore a part or all of the spam filtering rules included in the request, may update existing spam filtering rules with the accepted ones from the request, etc. Message center 110 may also determine whether to activate new spam filtering rules immediately or at a later time.

In response to the request, message center 110 also transmits a response to spam center 130 with an appropriate result code. The response may include the following message elements:

Response:

```
Request ID
Request received timestamp
Response timestamp
Originating node address
Terminating node address
Result Code
* Policy Specific Result Code
{
        Policy ID
        Result Code
}
```

* sign indicates the message element should be multiple occurrences.

If spam center 130 receives a response that includes an error result code, then spam center 130 determines whether to resend the request to message center 110. The determination of whether to resend a request may depend on the error result code, a client ID, the spam filtering rules, etc. The times and intervals for resending requests may be statically configured at spam center 130 or determined automatically.

If message center 110 is configured to forward the spam filtering rules to other entities in network 100, such as message center 111, then message center 110 follows the procedures outlined above to send a request to message center 111.

Another model for distributing the spam filtering criteria is the selective push model. For the selective push model, one or more entities subscribe to spam center 130 to be notified of the spam filtering rules. Therefore, an entity, such as message center 110 assembles a request to subscribe or unsubscribe to distribution of the spam filtering rules. Message center 110 then sends the assembled request to spam center 130 (and/or other entities). The request for subscribing/unsubscribing to spam filtering rules (solicited) may have the following message elements:

Request:

```
Request ID
Request timestamp
Originating node address
Terminating node address
Anti-Spam Policy Instruction Control
{
        InstructionAction
        *Existing Policy IDs
}
```

*sign indicates the message element should be multiple occurrences.

When spam center 130 receives the request to subscribe/unsubscribe to distribution of the spam filtering rules, spam center 130 parses the request and extracts the message elements enclosed in the request. Spam center 130 may extract existing policy IDs from the request as a base of appropriate actions. For example, if there is no new spam filtering rule to be sent to message center 110, then spam center 130 should send an appropriate result code to message center 110. Spam center 130 may not send the spam filtering rules to message center 110 if no new rules apply even though the distribution status of message center 110 is recorded as "subscribed". Spam center 130 processes the content of message elements and generates spam filtering rules based on the message elements (if necessary). Spam center 130 may then start distribution of the spam filtering rules to message center 110 at the next scheduled event, or stop subsequent distribution of the spam filtering rules to message center 110.

In response to the subscribe request, spam center 130 transmits a response to message center 110 with an appropriate result code. The response may include the following message elements:

Response:
Request ID
Request received timestamp
Response timestamp
Originating node address
Terminating node address
Result Code If message center 110 receives a response from spam center 130 that includes an error result code, then message center 110 determines whether to resend the subscribe request to spam center 130. The times and intervals for resending requests may be statically configured at message center 110 or determined automatically.

Yet another model for distributing the spam filtering criteria is a pull or solicited model. For the pull model, an entity, such as message center 110, assembles a request for spam filtering rules. Message center 110 then sends the assembled request to spam center 130 (and/or other entities). The request for spam filtering rules (on-demand) may have the following message elements:

Request:

```
Request ID
Request timestamp
Originating node address
Terminating node address
Anti-Spam Policy Instruction Control
{
        InstructionAction
        *Existing Policy IDs
}
```

*sign indicates the message element should be multiple occurrences.

When spam center 130 receives the request for spam filtering rules, spam center 130 parses the request and extracts the message elements enclosed in the request. Spam center 130 may extract existing policy IDs from the request as a base of appropriate actions. For example, if there is no new policy rule to be sent to an entity, then spam center 130 should send an appropriate result code to message center 110 but without a policy body. Spam center 130 processes the content of message elements and takes appropriate action depending on whether the query mechanism is synchronous or asynchronous. If the query mechanism is synchronous, then spam center 130 assembles a response that includes the spam filtering rules and/or a result code. The response may have the following message elements:

Response:

```
Request ID
Request received timestamp
Response timestamp
Originating node address
Terminating node address
Result Code
* Policy Body
{
        Policy ID
        Network types
*       Protocol ID
*       Message Types
        Message attributes
```

```
       *   Suspicious network domain
       *   Suspicious address
       *   Suspicious address type
           Spam type
           Language indicator
           Detection information
           {
           * Algorithm ID
           *   Rule ID
           *   Spam Keyword
           *   Spam Pattern
           }
           Action information
           {
               Block with notification
               Block without notification
               Unblock and deliver
               Hold and quarantine
           }
           Privacy shield information
           Affective filtering start timestamp
           Affective filtering stop timestamp
       }
```

* sign indicates the message element should be multiple occurrences.

If the query mechanism is asynchronous, then spam center 130 assembles a response that includes a result code to acknowledge the request, but with no spam filtering rules. To distribute the spam filtering rules to message center 110, spam center 130 assembles a new request that includes the spam filtering rules. Spam center 130 then sends the assembled request to message center 130. An example of such a request was provided above for the unsolicited model. In response to the request that includes the spam filtering rules, spam center 130 receives a response with the appropriate result code.

The message elements included in the requests and responses described above may include the following:

Request ID: Request ID is of type string and is the unique identifier for a request.

Request Timestamp Request timestamp is of type Time and holds the time which a request was originated by an originating node.

Request Received Timestamp: Request received timestamp is of type Time and holds the time in which a request was received by a terminating node.

Response Timestamp: Response timestamp is of type Time and holds the time which a response was sent by a terminating node.

Originating Node Address: Originating node address is of type String and includes the originating address.

Termination Node Address: Terminating node address is of type String and includes the recipient address.

Policy Body: Policy body is of type Group and includes the policy elements. 0 or more policies may be included in the policy body that define spam filtering rules.

Policy ID: Policy ID is of type Integer and is the unique identifier for this policy.

Network Type Network type is of type Enumerated and is the indicator for the network types, such as GSM, UMTS, LTE, 3GPP, CDMA, other, unknown, etc.

Protocol ID: Protocol ID is of type Enumerated and is the indicator for the message protocol applicable for the policy, such as SMTP, SMPP, 3GPP MAP, 3GPP SIP, 3GPP2 SIP, ANSI SMDPP, etc.

Message Type Message type is of type Enumerated and is the indicator for the message types, such as email, SMS, MMS, IM, etc.

Message Attributes: Message attribute is of type Data Structure and includes additional information about messages applicable to the policy. The attributes depend on message types. Each message type has its own set of attributes.

Suspicious Network Domain: Suspicious network domain is of type String, and includes the domain name of the network which is considered suspicious or bad.

Suspicious Address: Suspicious address is of type String and includes the address which is considered suspicious or bad.

Suspicious Address Type: Suspicious address type is of type String and is an indicator of type of suspicious address, IP address, mobile number (MSISDN, IMSI), email address, etc.

Spam Type: Spam type is an optional field of type Enumerated and includes the following spam types:
  Spam
  Phishing
  Spoofing
  Malware (e.g., virus/spyware)
  Fake sender address
  Mis-categorized
  Unauthorized sender/recipient
  Suspicious network/domain
  Message flooding
  Denial of service attack
  Malware (e.g., virus/spyware)
  Unauthorized message (violation of a security policy)
  Invalid message format
  Not Spam Language Indicator: Language indicator is of type Integer and is the indicator of the language of the message.

Detection Information Detection information is of type Structure and includes information on the algorithms or methods used to screen/filter the message:
  Algorithm ID
  Rule ID
  Spam Keyword
  White/black list
  Spam Pattern Match
  Volume threshold per sender match
  Volume threshold per sending network/domain match
  Others Action Information: Action information is of type Enumerated and includes an action taken regarding the message:
  Block with notification
  Block without notification
  Unblock and deliver
  Hold and quarantine
  Others Privacy Shield Information: Privacy shield information is of type Structure and includes a privacy shield and sharing instruction.

Affective Filtering Start Timestamp: Affective filtering start timestamp is of type Time and holds the time the policies included in the request should start.

Affective Filtering Stop Timestamp: Affective filtering stop timestamp is of type Time and holds the time the policies included in the request should stop.

Result Code Result Code is of type Integer and holds the processing return result from the receiving node.

Anti-Spam Policy Instruction Control: Anti-Spam Policy Instruction Control is of type Grouped. It includes information on the action requested by the entity and information on any existing policy IDs that the entity already has.

InstructionAction: InstructionAction is of type enumerated and can have any of these values: SubscribeInstruction, UnsubscribeInstruction, or ImmediateInstruction.

Existing Policy IDs: Existing Policy IDs is list of policy IDs that the entity already has. This is useful for Subscriber-instruction and ImmediateInstruction option.

The receiving node includes appropriate return codes in responses to a sending node for policy instruction/distribution operation. The result codes may include the following:

Normal Return Codes

200 OK: Receiving node accepted the request and there was no new policy to apply.

202 Accepted: Receiving node accepted the request and there was no problem parsing the request.

212 Applied: Received policies have been applied in the entity for scheduled spam filtering and detection.

Error Return Codes

400 Bad request: The request format and content could not be understood.

401 Unauthorized: The sending node is not authorized to send a policy instruction/distribution request to the receiving node.

406 Not Acceptable: The policies received in the request are not acceptable.

409 Conflict: The request is in conflict with existing policy rules.

420 Unsupported Network Type: Network type is not supported at receiving node.

421 Unsupported Spam Type: Spam type is not supported at receiving node.

422 Unsupported Message Type: Message type is not supported at receiving node.

480 Temporarily Unavailable: The receiving node is temporarily unavailable.

500 Internal System Error: The receiving node has internal system error.

503 Service Unavailable: The receiving node is unavailable for the requested service.

The requests and responses may be communicated via a transaction protocol. A sending node may initiate each transaction by sending an [RFC2616] HTTP POST message to the URI of the receiving node. The body of the HTTP request includes the request content specified above. After receiving and processing the HTTP POST request, the receiving node responds with an [RFC2616] HTTP response. The body of the HTTP response includes the response content specified above.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A method comprising:
receiving spam reports in a spam center from multiple entities of a communication network that detect spam in prior electronic messages that are transported over the communication network;
analyzing the spam reports in the spam center to generate new spam filtering rules;
receiving a request from a first entity for the new spam filtering rules, wherein the request includes a list of existing policy identifiers for policies used by the first entity for detecting spam;
parsing the request to extract the existing policy identifiers for the first entity;
determining, in the spam center, whether a new policy of the new spam filtering rules applies to the first entity based on the existing policy identifiers provided in the request;
when a new policy of the new spam filtering rules applies to the first entity, the method includes transmitting a response from the spam center to the first entity with a result code indicating that the new policy applies to the first entity, wherein the response has a policy body that details the new policy of the new spam filtering rules that is applicable to the first entity based on the existing policy identifiers indicated in the request from the first entity;
when no new policy of the new spam filtering rules applies to the first entity, the method includes transmitting the response from the spam center to the first entity with a result code indicating that no new policy applies to the first entity.

2. The method of claim 1 wherein:
the policy body of the response indicates an algorithm identifier for detecting spam in a subsequent electronic message in the first entity, and indicates an action to take in the first entity regarding the subsequent electronic message.

3. The method of claim 1 wherein:
the policy body of the response indicates a message type that applies to the new policy of the new spam filtering rules.

4. The method of claim 1 wherein:
the policy body of the response indicates a protocol identifier for a messaging protocol that applies to the new policy of the new spam filtering rules.

5. The method of claim 1 wherein:
the policy body of the response indicates a type of network that applies to the new policy of the new spam filtering rules.

6. A system comprising:
a first messaging entity of a communication network that is configured to handle electronic messages transmitted over the communication network;
the first messaging entity including a processor that is further configured to detect spam in the electronic messages based on spam filtering rules, to generate spam reports for the electronic messages detected as comprising spam, and to transmit the spam reports to a centralized spam center that connects to multiple other messaging entities of the communication network;
the first messaging entity is further configured to receive updated spam filtering rules from the centralized spam center that are generated based on the spam reports, and to filter spam from subsequent electronic messages based on the updated spam filtering rules;
the first messaging entity is further configured to receive a request for the updated spam filtering rules from a second messaging entity that is also configured to handle electronic messages transmitted over the communication network, wherein the request includes a list of existing policy identifiers for policies used by the second messaging entity for detecting spam;
the first messaging entity is further configured to parse the request to extract the existing policy identifiers for the second messaging entity;
the first messaging entity is further configured to transmit a response to the second messaging entity that includes the updated spam filtering rules that are applicable to the second messaging entity based on the existing policy identifiers indicated in the request from the second messaging entity.

7. The system of claim 6 wherein:
the first messaging entity is further configured to identify at least a portion of the updated spam filtering rules to accept for filtering, and to filter the subsequent electronic messages based on the updated spam filtering rules that are accepted.

8. The system of claim 6 wherein:
the first messaging entity is further configured to identify at least a portion of the updated spam filtering rules to ignore for filtering, and to filter the subsequent electronic messages based on the updated spam filtering rules that are not ignored.

9. The system of claim 6 wherein:
the first messaging entity is further configured to send a request to the centralized spam center for the updated spam filtering rules.

10. The system of claim 6 wherein:
the electronic messages comprise Short Messaging Service (SMS) messages;
the first messaging entity comprises an SMS message center; and
the second messaging entity comprises another SMS message center.

11. The system of claim 6 wherein:
the first messaging entity is further configured to activate the updated spam filtering rules received from the centralized spam center immediately.

12. The system of claim 6 wherein:
the first messaging entity is further configured to activate the updated spam filtering rules received from the centralized spam center at a later time.

13. A system comprising:
a spam center configured to connect to entities of a communication network that handle electronic messages;
the spam center including a processor that is configured to receive spam reports from the entities that detect spam in prior electronic messages, and to analyze the spam reports to generate new spam filtering rules;
the spam center is further configured to receive a request from a first entity for the new spam filtering rules, wherein the request includes a list of existing policy identifiers for policies used by the first entity for detecting spam;
the spam center is further configured to parse the request to extract the existing policy identifiers for the first entity, and to determine whether a new policy of the new spam filtering rules applies to the first entity based on the existing policy identifiers provided in the request;
when a new policy of the new spam filtering rules applies to the first entity, the spam center is configured to transmit a response to the first entity with a result code indicating that the new policy applies to the first entity, wherein the response has a policy body that details the new policy of the new spam filtering rules that is applicable to the first entity based on the existing policy identifiers indicated in the request from the first entity;
when no new policy of the new spam filtering rules applies to the first entity, the spam center is configured to transmit the response to the first entity with a result code indicating that no new policy applies to the first entity.

14. The system of claim 13 wherein:
the policy body of the response indicates an algorithm identifier for detecting spam in a subsequent electronic message in the first entity, and indicates an action to take in the first entity regarding the subsequent electronic message.

15. The system of claim 13 wherein:
the policy body of the response indicates a message type that applies to the new policy of the new spam filtering rules.

16. The system of claim 13 wherein:
the policy body of the response indicates a protocol identifier for a messaging protocol that applies to the new policy of the new spam filtering rules.

17. The system of claim 13 wherein:
the policy body of the response indicates a type of network that applies to the new policy of the new spam filtering rules.

* * * * *